Aug. 10, 1943.  L. B. EHRLICH  2,326,342
SOLENOID SWITCH
Filed May 23, 1940
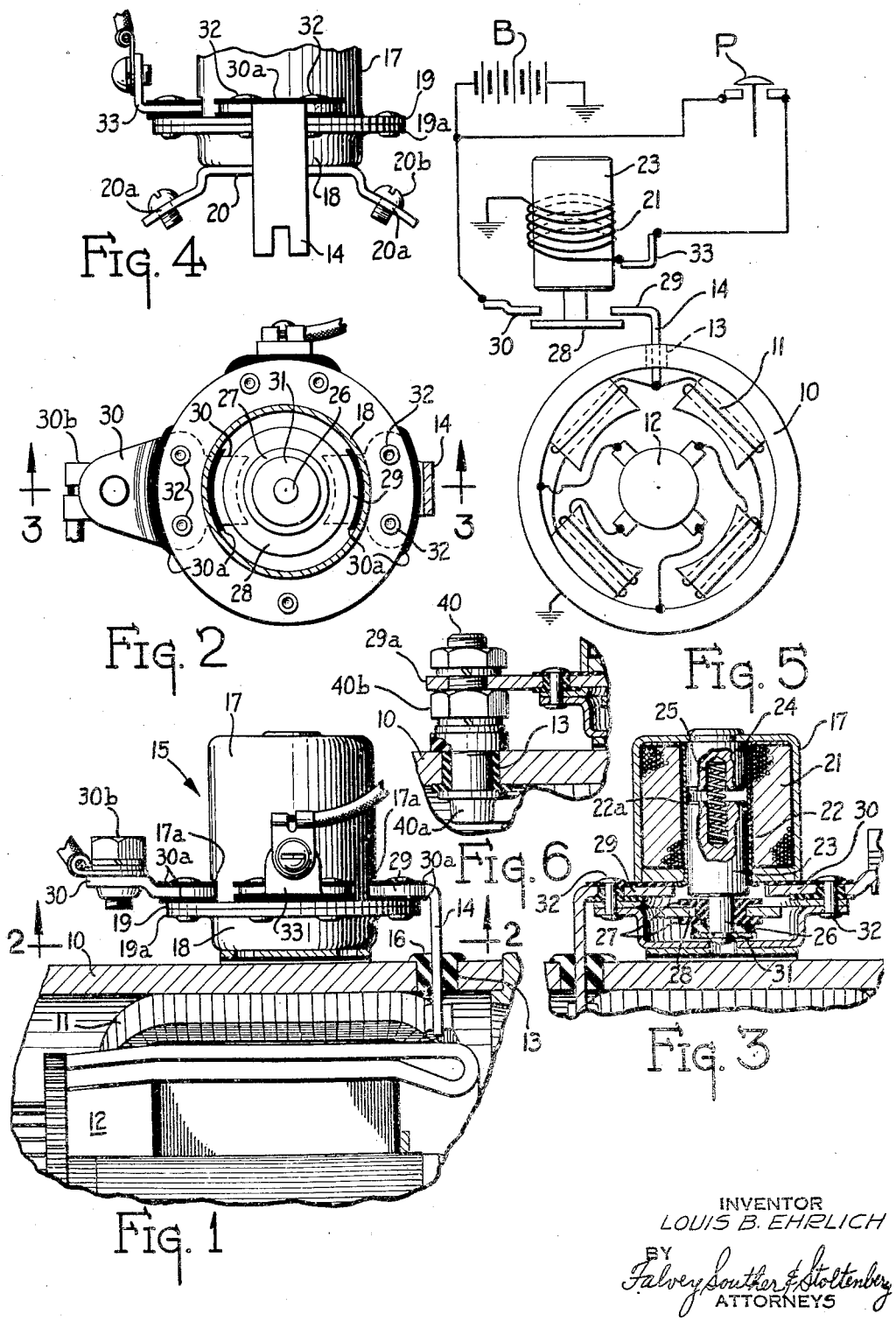
INVENTOR
LOUIS B. EHRLICH
BY
Falvey Souther & Stoltenberg
ATTORNEYS Patented Aug. 10, 1943

2,326,342

UNITED STATES PATENT OFFICE 2,326,342

SOLENOID SWITCH

Louis B. Ehrlich, Toledo, Ohio

Application May 23, 1940, Serial No. 336,798

5 Claims. (Cl. 200—111)

This invention relates to solenoid-actuated switching devices, more particularly to a solenoid control switch adapted to be attached to the casing of an electric motor to be controlled.

Solenoid-actuated switches have in the past been attached in certain applications to the casing of the motor which they control but it has been a problem in the art to construct a switch of this type which may be attached to the motor casing as a unit to allow separate fabrication thereof. The problem involves the construction of a switch device which is very simple to manufacture and which reduces the cost of manufacturing to a minimum. In order to attain this result, greater economy has been attained by the use of single element to serve several functions, so arranged as to limit the amount of material used to attain a specific purpose and also to so conform parts that a minimum of labor expense is expended in their fabrication, adjustment, and attachment in operable relation on the motor casing.

It is, therefore, a principal object of this invention to provide a solenoid actuated switch in which a novel casing is provided having outwardly extending flange means which are adapted to position internal contacts of the switching device and also to provide a means to fasten the casing permanently in position with reference to a motor casing.

It is a further object of this invention to provide a solenoid-actuated switching device in which are incorporated novel features of design which achieve greater simplicity of structure to allow fabrication at a minimum cost.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is an elevational view, partly in section, showing the invention attached to the casing of a motor to be controlled.

Figure 2 is a plan view, partly in section, taken along line 2—2 of Figure 1.

Figure 3 is an elevational view, in section, taken along the line 3—3 of Figure 2.

Figure 4 is an elevational view taken at right angles to the view shown in Figure 1.

Figure 5 is a schematic diagram of connections.

Figure 6 is an elevational view, partly in section, showing a modified form of the method of making connections.

Referring to Figure 1, a cylindrical motor casing 10 is shown having positioned therein usual field structure 11 and a rotatable armature 12. An aperture 13 is provided in the casing 10 adjacent the end of the field structure 11, through which extends a connecting lug 14 of a unitary solenoid-actuated switching device 15 positioned adjacent the aperture and fixedly attached to the casing in any convenient manner. The lug 14 is carefully insulated from the casing 10 by means of a rubber grommet 16 positioned in the aperture 13 as clearly shown.

The unitary solenoid-actuated switching assembly is enclosed in a split casing formed of two cup-shaped members 17 and 18, the upper of which is relatively deep compared to the lower one but having substantially the same diametrical dimension. These cups are positioned with their open ends contiguous, each being provided with an annular flange 19 and 19a which cooperate together to form a means for fastening the cups together to form a container. The flanges 19 and 19a are fastened by rivets having further functions to be described in detail hereinafter.

The lower relatively shallow cup member 18 is provided at its base with a bracket 20 which may be conveniently welded or otherwise fastened thereto, the bracket having laterally extending wings 20a which are apertured to receive screws 20b whereby they may be conveniently attached to the motor casing 10 in properly aligned threaded apertures (not shown).

On the interior of the relatively deep upper cup-shaped member 17, preferably made of magnetic material, a magnetic coil 21 (Fig. 3) is positioned having a concentric central opening 22 defined by a sleeve member 22a, in which a cylindrical armature 23 is adapted to move. Adjacent the upper end of the central opening 22 in the cup-shaped member 17, a field stud 24 is firmly riveted in position to the bottom of the cup to cooperate with the armature 23, so as to complete the magnetic circuit of the coil and to limit the movement of the armature 23 therein. A spring 25 is provided which is seated in aligning sockets in the field piece 24 and the armature 23 to bias the armature outwardly from the coil 21 to maintain the armature in its neutral position shown in Figure 3 where the lower end of the armature contacts the bottom of the lower cup-shaped container 18 to limit its movement in the downwardly direction.

The lower end of the armature 23 is provided with an integral stud 26, upon which is loosely mounted by means of insulating rings 27, an annular contact member 28 of substantially larger diameter than the armature with which it is concentrically mounted. The contact 28 is preferably loosely mounted upon the stud, so as to allow alignment with stationary contacts 29 and 30. The insulating washers 27 insulate the annular contact 28 from the armature 23 and the stud 26 and are held in position on the stud by means of a washer 31 riveted on the lower end of the stud 26.

The stationary contacts 29 and 30 extend from the exterior into the casing 17 through diametrically opposed apertures 17a and are held in insulated relation with the casing by plates 30a by means of rivets 32 which thread apertures in the contact member and the flanges 19 and 19a of the cup-shaped member. The contacts 29 and 30 extend into the casing sufficiently to overlap the annular contact 28 with which they cooperate to complete the power circuit through the motor. The contact 29 (Figure 3) is preferably made integral with the lug 14 which extends through the aperture 13 in the casing 10, having electrical connection with the field structures 11 as is shown in Figures 1 and 3. The contact 30 is provided at its outer end with a binding post arrangement 30b for convenient connection to the motor power circuit as shown in Figure 1. In order to increase the contactual area of the contacts 29 and 30, in their cooperation with the movable contact 28 under the control of the armature 23, the inner ends of the contacts are given a curved formation concentric with the center of the contact 28 as is clearly shown in Figure 2.

By this construction, the stationary contacts 29 and 30 and the cup-shaped members 17 and 18 are firmly held in position by the same rivets 32 which is a simplification of structure very desirable in mass production. The inner ends of the contacts 29 and 30 also tend to hold the coil 21 firmly in position in the upper portion of the casing 17 by overlapping the lower end of the coil as shown in Figure 3.

As the contact 28 is moved upwardly under the influence of the magnetic flux of the coil 21, acting upon the armature 23, it will short-circuit the contacts 29 and 30 to place the motor in circuit with a battery B as is clearly shown in Figure 5 in the schematic diagram of connections. In this diagram of connections, the solenoid coil 21 is under the control of a push-button P which closes the circuit through the coil 21 and allows the energy from the battery B to actuate the solenoid. For convenient connection, one end of the coil 21 is preferably grounded to the casings 17 and 18, while the other end of the solenoid is led from the casing by means of a binding post 33 (Figure 1) which is insulatably mounted upon the upper side of the flange 19 by means of rivets.

Referring to Figure 6, the connecting lug 14 which extends through the aperture 13 in Figure 1 may be replaced by a stud 40 which is insulatably mounted in the aperture 13 and having its head 40a cooperating with the field 11 on the inside of the casing 10. The stud 40 is held in position in the casing by means of lock nuts 40b, between which is positioned an apertured extension member 29a of the contact 29.

It is obvious that the location of the aperture 13 in the casing 10 is selected at such a point where convenient connection can be made between the field structures 11 and the lug 14 or the stud 40, so as to allow convenient assembly of the unitary switch assembly upon the motor.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a device of the class described, a pair of cups having their open ends cooperating together to form an enclosure, magnetic solenoid means having a movable armature positioned in the enclosure, outwardly projecting flange means on the lips of the cups, at least a pair of strip-like contact means cooperating with their flat sides with the flange means and adapted to extend in spaced relation into the enclosure through apertures in the wall of the cups to hold a portion of the solenoid means in position, fastening means in aligning apertures in the flange means and the contact means adapted to hold the cups and contact means in cooperative relation, means to insulate the contact means from the cups, a movable contact carried by the armature to cooperate with the spaced contacts to close a circuit between them when the armature is under the influence of a magnetic field of the solenoid, and resilient means to move the movable contact and the armature to the initial position upon termination of the magnetic field.

2. In a device of the class described, a pair of flanged cups of substantially the same diametrical dimension but of different depths adapted to be fitted together in inverted position to form an enclosure, a solenoid coil adapted to be fitted into the deeper of the cups, a pair of flat, strip-like contacts positioned in spaced relation in the enclosure and adapted to extend radially outwardly through apertures in the enclosure adjacent the flanges of the cups, means to insulate the contacts from the enclosure, fastening means adapted to hold the contacts and the flanges of both cups in fixed cooperative relation, an armature in the enclosure adapted to be moved by the solenoid coil, a movable contact under control of the armature and adapted to close a circuit between the contacts when the armature is moved by the solenoid coil, and resilient means to bias the armature and the movable contact to an initiating point.

3. An electromagnetic starting motor switch adapted to be mounted directly upon the frame of a starting motor, comprising in combination a divided casing, outwardly projecting flanges on the edges of the parts of the casing adapted to be fitted together to form the casing, a pair of flat, strip-like contact members cooperating with the flanges and held in insulated relation therewith to extend into the casing from substantially diametrically opposed directions through apertures formed in the wall of the casing, fastening means to hold the contact members and the flanges together, said fastening means also serving to hold the divided casing together, a movable contact in the casing adapted to close a circuit between the fixed contact members, solenoid means in the casing to move the movable contact into circuit closing position on the fixed contact members, resilient means to bias the movable contact to an initiating point, and means on the casing to attach the whole assembly to the starting motor frame.

4. An electromagnetic starting motor switch adapted to be mounted directly upon the frame of a starting motor, comprising in combination, a pair of outwardly flanged cups of substantially the same tranverse dimensions but of different depths adapted to be fitted together in inverted position to form an enclosure, a solenoid coil adapted to be fitted into the deeper of the cups, a pair of contacts made from flat strips positioned in spaced relation in the enclosure to hold the solenoid coil in position in its cup and adapted to extend radially outwardly through apertures in the wall of the enclosure to rest on their flat sides on the flanges thereof, means to insulate the contacts from the enclosure, fastening means cooperating with the contacts and flanges to hold the whole assembly rigidly together, an armature in the enclosure adapted to be moved by the solenoid coil, a movable contact under control of the armature and adapted to be moved thereby to close a circuit between the contacts, resilient means to bias the armature and the movable contact to an initiating point, and means on the shallow cup to attach the whole assembly to the motor frame.

5. The combination set forth in claim 4 further characterized by having a depending portion on one of the flat contacts to extend through an aperture in the motor frame to make connection with the motor circuit when the whole assembly is attached to the motor frame.

LOUIS B. EHRLICH.